United States Patent [19]

Lauri

[11] Patent Number: 5,352,710
[45] Date of Patent: Oct. 4, 1994

[54] NEITHER TOXIC NOR ENVIRONMENTALLY NOXIOUS FOAMED-POLYMER PRODUCTS

[75] Inventor: Leone Lauri, Ponte Nelle Alpi, Italy

[73] Assignee: Prima S.p.A., Venezia, Italy

[21] Appl. No.: 884,737

[22] Filed: May 15, 1992

[30] Foreign Application Priority Data

May 17, 1991 [IT] Italy ................ MI 91 A 001358
Oct. 15, 1991 [IT] Italy ................ MI 91 A 002720

[51] Int. Cl.$^5$ .................................... C08F 14/06
[52] U.S. Cl. ............................ 521/137; 521/113; 521/123; 521/124; 521/125; 521/128; 521/130; 521/131; 521/145; 521/146; 521/155; 521/160
[58] Field of Search ............. 521/145, 155, 123, 124, 521/137, 113, 125, 128, 130, 131, 146, 160

[56] References Cited

U.S. PATENT DOCUMENTS 3,256,217  6/1966  Landler et al. ................ 521/79
4,423,110 12/1983  Sato .
4,701,472 10/1987  Koebisu et al. ................ 521/96

FOREIGN PATENT DOCUMENTS 74907   3/1983  European Pat. Off. .
1923570 11/1969 Fed. Rep. of Germany .
2407234  5/1979  France .
44900   1/1964  Luxembourg .
135799 12/1972  Netherlands .

OTHER PUBLICATIONS

European Search Report.
Chemical Abstract 147685V, vol. 89, No. 18, Oct. 1978.

*Primary Examiner*—John Kight, III
*Assistant Examiner*—John M. Cooney, Jr.
*Attorney, Agent, or Firm*—Hedman, Gibson & Costigan

[57] ABSTRACT

A cellular, foamed-polymer product is disclosed, which is constituted by a mixture comprising: at least one isocyanate, at least one anhydride, at least one vinylidene compound, poly-(vinyl chloride), at least one foaming agent, a heat stabilizer, calcium stearate and zinc stearate.

The product production scraps and processing wastes and residues are not riskful for health and environment, and can be disposed of as "waste similar to solid municipal waste".

10 Claims, No Drawings

NEITHER TOXIC NOR ENVIRONMENTALLY NOXIOUS FOAMED-POLYMER PRODUCTS

The present invention relates to cellular, foamed-polymer products based on poly-(vinyl chloride), in which the production scraps, the processing wastes and residues and the composites fabricated by using said cellular foamed polymer, when have become no longer useable, can be disposed as "waste similar to solid municipal waste", therefore with no risks for health or environment.

The presently known product is constituted by a mixture of one or more isocyanates, such as toluene-diisocyanate and/or polymethylene-polyphenylisocyanate, poly-(vinyl chloride), one or more anhydrides, such as maleic anhydride and/or phthalic anhydride, one or more vinylidene compounds, such as styrene and acrylonitrile, a foaming agent, such as azobis-(isobutyronitrile), one or more heat stabilizer compounds, such as tribasic lead sulfate, dibasic lead phosphite, dibasic lead phthalate or barium-cadmium-zinc, lead-barium complexes.

Said mixture, of thick consistency, after being compounded in a dissolver, is cast into a mould, and the temperature is then increased under pressure, until the temperature of 180° C. is reached, in order to cause the gelation of poly-(vinyl chloride) to take place.

The semi-foamed article obtained, i.e., the "embryo", will complete its foaming by being heated in the presence of water or steam.

The resulting cellular product may not be disposed of as a "solid municipal waste", because it contains inorganic compounds, such as tribasic lead sulfate, dibasic lead phosphite, organic compounds of metals, such as dibasic lead phthalate and barium-cadmium-zinc, lead-barium complexes, which are toxic and noxious.

The general purpose of the present invention is of providing a foamed-polymer product based on poly-(vinyl chloride) in which the production scraps, the processing wastes and residues and the composites fabricated by using said cellular foamed product, when no longer useable, can be disposed of as "waste similar to solid municipal waste", therefore with no risks for health and environment.

This purpose is achieved according to the present invention by the products disclosed in the following specification and claimed in the appended claims.

In a first form of practical embodiment thereof, the cellular foamed product manufactured according to the present invention is constituted by a mixture of one or more isocyanates, such as 2,4/2,6-toluene-diisocyanate and/or 4,4'-diphenylmethane-diisocyante, one or more anhydrides, such as maleic anhydride and/or phthalic anhydride, a vinylidene compound, such as styrene, poly-(vinyl chloride), one or more foaming agents, such as azobis-(isobutyronitrile) and azodicarbonamide, and a heat stabilizer, composed by a mixture of beta-diacetones, the main component of which is stearoyl-benzoyl-methane (available on the market under the trade name "Rhodiastab 50"), calcium stearate and zinc stearate. After the compound mixing step, the resulting compound, now because of thick consistency, is cast into a mould, is progressively heated, under pressure, until the maximum temperature of 185° C. is reached, in order to cause the gelation of poly-(vinyl chloride) to occur. After cooling, the resulting embryo is foamed, by causing the isocyanates and anhydrides to react with water, until the desired bulk density is obtained. The resulting cellular foamed article displays extremely good mechanical and chemical characteristics and temperature resistance, and its production scraps and processing wastes and residues production scraps and processing wastes and residues can be disposed of as "waste similar to solid municipal waste".

As an alternative, a cellular foamed article endowed with good mechanical characteristics, chemical resistance and temperature resistance—the scraps and wastes and residues respectively resulting from the production and processing thereof can anyway be disposed of as "waste similar to solid municipal waste"—can be produced by following the above disclosed process, by using a mixture composed by one or more isocyanates, such as 2,4/2,6-toluene-diisocyanate and/or 4,4'-diphenylmethane-diisocyanate, one or more anhydrides, such as meleic anhydride and/or phthalic anhydride, poly-(vinyl chloride), one or more foaming agents, such as azobis-(isobutyronitrile) and azodicarbonamide and a heat stabilizer composed by a mixture of beta-diacetones, the main component of which is stearoyl-benzoyl-methane (available on the market under the trade-name "Rhodiastab 50"), calcium stearate and zinc stearate.

In a further form of practical embodiment, a cellular foamed product is constituted according to the present invention by a mixture composed by one or more isocyanates, such as 2,4/2,6-toluene-diisocyanate and/or 4,4'-diphenylmethane-diisocyanate, one or more anhydrides, such as maleic anhydride and/or phthalic anhydride, poly-(vinyl chloride); one or two foaming agents, such as azobis-(isobutyronitrile) and azodicarbonamide; if so desired, a vinylidene compound, such as styrene, acrylonitrile; one or more heat stabilizers for poly-(vinyl chloride), such as: dibutyl-tin laurate, octyl-tin carboxylate, butyl-tin mercaptide, butyl-tin mercaptide carboxylate, butyl-tin maleate, butyl-tin carboxylate, octyl-tin mercaptide, barium stearate, calcium stearate and/or zinc stearate, barium-zinc complex, magnesium oxide. Preferred for the present invention are butyl-tin mercaptide carboxylate, barium-zinc complex, the mixture constituted by beta-diacetones-calcium stearate-zinc stearate.

After being compounded, the mixture, which has become now of thick consistency, is cast into a mould, is progressively heated, under pressure, until the temperature of 180° C. is reached, in order to cause the gelation of poly-(vinyl chloride) to occur. After cooling, the resulting embryo is foamed, by causing isocyanates and anhydrides to react with water, until the desired bulk density is obtained. The resulting cellular foamed article displays extremely good mechanical and chemical characteristics and temperature resistance, and its production scraps and processing wastes and residues can be disposed of as "solid municipal waste".

FORMULATION EXAMPLES

Example 1

A paste-like compound composed by a mixture of:
from 1% to 20% of 4,4'-diphenylmethane-diisocyanate
from 10% to 30% of 2,4/2,6-toluene-diisocyanate
from 5% to 10% of maleic anhydride
from 40% to 60% of poly-(vinyl chloride)
from 3% to 10% of phthalic anhydride
from 0.5% to 7% of azobis-(isobutyronitrile)
from 0.1% to 3% of azodicarbonamide from 1% to 5% of styrene
from 0.3% to 3% of the mixture consisting of Rhodiastab 50, calcium stearate and zinc stearate
wherein the percentage by weight of each individual component is referred to the total weight of the mixture.

Said compound is mixed in the dissolver, is filtered, is poured into the mould either directly or after undergoing a "setting" process, with the resulting set bodies being subsequently charged to the mould, and, after being submitted to the "heating under pressure/cooling" cycle, the resulting semi-foamed embryos will complete their foaming inside ovens, under a dynamic atmosphere of saturated steam.

The cellular foamed articles are then submitted to a heat treatment in air, inside ovens, at a temperature comprised within the range of from 80° C. to 125° C., for from 24 to 120 hours, and cellular foamed articles are obtained as the result, which display values of bulk density of 55 kg/m$^3$, heat distorsion temperature under bending stress comprised within the range of from 130° C. to 140° C., compression strength, at the temperature of 80° C., of 4.1 kg/cm$^2$, a very high chemical resistance such that, e.g., the absorption of styrene, after a 2-hour soaking of a sample of the foamed articles, is of 2% by weight, relatively to the weight of the tested sample, suitable for being submitted to industrial processing cycles which involve the exposure to temperatures of 120° C., and the application of pressures of 1 kg/cm$^2$, for a 90-minute time.

Example 2

A paste-like compound composed by a mixture of:
from 1% to 28% of 4,4'-diphenylmethane-diisocyanate
from 1% to 30% of 2,4/2,6-toluene-diisocyanate
from 3% to 12% of maleic anhydride
from 48% to 55% of poly-(vinyl chloride)
from 3% to 14% of phthalic anhydride
from 1% to 10% of azobis-(isobutyronitrile)
from 0.02% to 4% of azodicarbonamide
from 0.2% to 3% of the mixture consisting of Rhodiastab 50, calcium stearate and zinc stearate
wherein the percentage by weight of each individual component is referred to the total weight of the mixture.

Said compound is mixed in the dissolver, is poured into the mould and poly-(vinyl chloride) is caused to undergo gelation at a maximal temperature of 185° C. under pressure. On cooling, the embryo is obtained which, after being foamed in water or in the presence of steam (at the temperature of 98° C.), yields a cellular foamed article with a bulk density of 30 kg/m$^3$, a heat distorsion temperature of 100° C., a compression strength of 2.7 kg/cm$^2$ at room temperature, a styrene absorption, after total-article dipping, of 6% by weight, relatively to the weight of the tested sample, with a fine, regular cell texture.

Example 3

A paste-like compound composed by a mixture of:
from 45% to 55% of poly-(vinyl chloride)
from 5% to 15% of phthalic anhydride
from 15% to 30% of 2,4/2,6-toluene-diisocyanate
from 0.2% to 3% of azodicarbonamide
from 0.2% to 3% of azobis-(isobutyronitrile)
from 0.2% to 2.5% of the mixture consisting of Rhodiastab 50, calcium stearate and zinc stearate
from 2% to 5% of plasticizer based on phosphate or phthalate
from 0.1% to 0.5% of alpha-phenyl-indole
wherein the percentage by weight of each individual component is referred to the total weight of the mixture.

According to the manufacturing process disclosed in Example 2, said mixture will yield a cellular foamed article having a bulk density of 80 kg/m$^3$, a heat distorsion temperature, under bending stress, of 90° C., a styrene absorption, after a 2-hour total-article dipping time, of 7% by weight, relatively to the weight of the tasted sample, good elastic properties, constant use temperature of 70° C.

Example 4

A paste-like compound composed by a mixture of:
from 5% to 30% of 2,4/2,6-toluene-diisocyanate
from 1% to 30% of 4,4'-diphenylmethane-diisocyanate
from 3% to 17% of phthalic anhydride
from 1% to 7% of azobis-(isobutyronitrile)
from 0.5% to 5% of azodicarbonamide
from 0.5% to 2% of the mixture consisting of Rhodiastab 50, calcium stearate and zinc stearate
from 40% to 60% of poly-(vinyl chloride)
wherein the percentage by weight of each individual component is referred to the total weight of the mixture.

According to the manufacturing process disclosed in Example 2, said mixture will yield a cellular foamed article having values of bulk density of 60 kg/m$^3$, heat distorsion temperature, under bending stress, of 90° C., styrene absorption, after a 2-hour total-article dipping time, of 7% by weight, relatively to the weight of the tested sample, good elastic properties, constant use temperature of 70° C.

Example 5

A paste-like compound composed by a mixture of:
from 3% to 8% of 4,4'-diphenylmethane-diisocyanate
from 15% to 25% of 2,4/2,6-toluene-diisocyanate
from 6% to 9% of maleic anhydride
from 50% to 55% of poly-(vinyl chloride)
from 6% to 14% of phthalic anhydride
from 1.5% to 10% of azobis-(isobutyronitrile)
from 0.02% to 2% of azodicarbonamide
from 0.2% to 3% of the mixture consisting of beta-diacetones-calcium stearate-zinc stearate
wherein the percentage by weight of each individual component is referred to the total weight of the mixture.

Said mixture is compounded in the dissolver, is poured into the mould and poly-(vinyl chloride) is caused to undergo gelation at the temperature of 180° C. under pressure. On cooling, the embryo is obtained which, after being foamed in water or in the presence of steam (at the temperature of 98° C.), yields a cellular foamed article with a bulk density of 30 kg/m$^3$, a heat distorsion temperature of 100° C., a compression strength of 2.7 kg/cm$^2$ at room temperature, a styrene absorption, after total-article dipping, of 6% by weight, relatively to the weight of the tested sample, with a fine, regular cell texture.

Example 6

A paste-like compound composed by a mixture of:
from 50% to 55% of poly-(vinyl chloride)
from 8% to 12% of phthalic anhydride from 25% to 30% of 2,4/2,6-toluene-diisocyanate
from 1% to 2% of azodicarbonamide
from 1% to 2% of azobis-(isobutyronitrile)
from 0.1% to 5% of butyl-tin mercaptide carboxylate
from 2% to 5% of plasticizer based on phosphate or phthalate
from 0.1% to 0.5% of alpha-phenyl-indole
wherein the percentage by weight of each individual component is referred to the total weight of the mixture.

According to the manufacturing process disclosed in Example 5, said mixture will yield a cellular foamed article having a bulk density of 80 kg/m$^3$, a heat distorsion temperature, under bending stress, of 90° C., a styrene absorption, after a 2-hour total-article dipping time, of 7% by weight, relatively to the weight of the tested sample, good elastic properties, constant use temperature of 70° C.

Example 7

A paste-like compound composed by a mixture of:
from 5% to 30% of 2,4/2,6-toluene-diisocyanate
from 5% to 30% of 4,4'-diphenylmethane-diisocyanate
from 3% to 17% of phthalic anhydride
from 1% to 6% of azobis-(isobutyronitrile)
from 0.5% to 5% of azodicarbonamide
from 0.1% to 4% of barium-zinc complex
from 40% to 60% of poly-(vinyl chloride).
wherein the percentage by weight of each individual component is referred to the total weight of the mixture.

According to the manufacturing process disclosed in Example 5, said mixture will yield a cellular foamed article having a bulk density of 80 kg/m$^3$, a heat distorsion temperature, under bending stress, of 90° C., a styrene absorption, after a 2-hour total-article dipping time, of 7% by weight, relatively to the weight of the tested sample, good elastic properties, constant use temperature of 70° C.

Example 8

A paste-like compound composed by a mixture of:
from 1% to 10% of 4,4'-diphenylmethane-diisocyanate
from 2% to 20% of 2,4/2,6-toluene-diisocyanate
from 5% to 14% of maleic anhydride
from 45% to 60% of poly-(vinyl chloride)
from 1% to 5% of phthalic anhydride
from 1% to 5% of styrene
from 0.1% to 0.5% of azobis-(isobutyronitrile)
from 0.1% to 0.7% of azodicarbonamide
from 0.1% to 7% of butyl-tin mercaptide carboxylate or:
from 0.1% to 7% of barium-zinc complex.
wherein the percentage by weight of each individual component is referred to the total weight of the mixture.

According to the manufacturing process disclosed in Example 5, said mixture will yield a cellular foamed article having a bulk density of 300 kg/m$^3$, a heat distorsion temperature, under bending stress, of 115° C., a compression strength of 100 kg/cm$^2$, practically no styrene absorption after a 2-hour total-article dipping time of the foamed article.

Example 9

A paste-like compound composed by a mixture of:
from 15% to 35% of 4,4'-diphenylmethane-diisocyanate
from 40% to 55% of poly-(vinyl chloride)
from 5% to 20% of phthalic anhydride
from 0.5% to 8% of azobis-(isobutyronitrile)
from 0.1% to 1.5% of azodicarbonamide
from 0.1% to 3% of magnesium oxide
wherein the percentage by weight of each individual component is referred to the total weight of the mixture.

According to the manufacturing process disclosed in Example 5, said mixture will yield a cellular foamed article having a bulk density of 40 kg/m$^3$, a heat distorsion temperature, under bending stress, of 95° C., a compression strength at room temperature of 4.5 kg/cm$^2$, a styrene absorption, after a 2-hour total-article dipping time, of 6% by weight, relatively to the weight of the tested sample.

The purpose declared in the preamble of the disclosure is hence achieved.

The scope of the invention is defined by the following claims.

I claim:

1. Cellular, foamed-polymer product characterized in that said product is constituted by:
   from 1% to 20% of 4,4,'diphenylmethane-diisocyanate
   from 10% to 30% of 2,4/2,6-toluene-diisocyanate
   from 5% to 10% of maleic anhydride
   from 40% to 60% of poly-(vinyl chloride)
   from 3% to 10% of phthalic anhydride
   from 0.5% to 7% of azobis-(isobutyronitrile)
   from 0.1% to 3% azodicarbonamide
   from 1% to 5% of styrene and
   from 0.3% to 3% of the mixture consisting essentially of beta-diacetones, calcium stearate and zinc stearate.

2. Cellular, foamed product characterized in that said product is formed from a mixture comprising:
   from 1% to 28% of 4,4,'diphenylmethane-diisocyanate
   from 1% to 30% of 2,4/2,6-toluene-diisocyanate
   from 3% to 12% of maleic anhydride
   from 48% to 55% of poly-(vinyl chloride)
   from 3% to 14% of phthalic anhydride
   from 1% to 10% of azobis-(isobutyronitrile)
   from 0.02% to 4% of azodicarbonamide
   from 0.2% to 3% of the mixture consisting essentially of beta-diacetones, calcium stearate and zinc stearate.

3. Cellular, foamed product characterized in that said product is formed from a mixture comprising:
   from 45% to 55% of poly-(vinyl chloride)
   from 5% to 15% of phthalic anhydride
   from 15% to 30% of 2,4/2,6-toluene-diisocyanate
   from 0.2% to 3% of azodicarbonamide
   from 0.2% to 3% of azobis-(isobutyronitrile)
   from 0.2% to 2.5% of the mixture consisting essentially of beta-diacetones, calcium stearate and zinc stearate from 2% to 5% of plasticizer based on phosphate or phthalate and from 0.1% to 0.5% of alpha-phenylindole.

4. Cellular, foamed product characterized in that said product is formed from a mixture comprising:
   from 5% to 30% of 2,4/2,6-toluene-diisocyanate
   from 1% to 30% of 4,4'-diphenylmethane-diisocyanate
   from 3% to 17% of phthalic anhydride
   from 1% to 7% of azobis-(isobutyronitrile)
   from 0.5% to 5% of azodicarbonamide from 0.5% to 2% of the mixture consisting essentially of beta-diacetone, calcium stearate and zinc stearate, and from 40% to 60% of poly-(vinyl chloride).

5. Product according to claim 1 characterized in that as the heat stabilizer, in the cellular foamed material based on poly-(vinyl chloride), a mixture is used, which is neither toxic nor noxious, which makes it possible for said cellular foamed article to be used in direct contact with alimentary products, said heat stabilizer being constituted by calcium stearate, zinc stearate and beta-diacetones which comprise stearoyl-benzoylmethane having the formula:

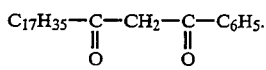

6. Cellular, foamed product characterised in that said product is made from a mixture comprising:
    from 3% to 8% of 4,4,'diphenylmethane-diisocyanate
    from 15% to 25% of 2,4/2,6-toluene-diisocyanate
    from 6% to 9% of maleic anhydride
    from 50% to 55% of poly-(vinyl chloride)
    from 6% to 14% of phthalic anhydride
    from 1.5% to 10% of azobis-(isobutyronitrile)
    from 0.02% to 2% azodicarbonamide
    from 1% to 5% of styrene and
    from 0.2% to 3% of the mixture consisting of beta-diacetones-calcium stearate and zinc stearate.

7. Cellular, foamed, product characterised in that said product is made from a mixture comprising:
    from 50% to 55% of poly-(vinyl chloride)
    from 8% to 12% of phthalic anhydride
    from 25% to 30% of 2,4/2,6-toluene-diisocyanate
    from 1% to 2% of azodicarbonamide
    from 1% to 2% of azobis-(isobutyronitrile)
    from 0.1% to 5% of butyl-tin mercaptide carboxylate
    from 2% to 5% of plasticizer based on phosphate or phthalate and
    from 0.1% to 0.5% of alpha-phenyl-indole.

8. Cellular, foamed, product characterised in that said product is made from a mixture comprising:
    from 5% to 30% of 2,4/2,6-toluene-diisocyanate
    from 5% to 30% of 4,4'-diphenylmethane-diisocyanate
    from 3% to 17% of phthalic anhydride
    from 1% to 6% of azobis-(isobutyronitrile)
    from 0.5% to 5% of azodicarbonamide
    from 0.1% to 4% of barium-zinc complex
    from 40% to 60% of polyvinyl chloride.

9. Cellular, foamed product characterised in that said product is made from a mixture comprising:
    from 1% to 10 of 4,4,'diphenylmethane-diisocyanate
    from 2% to 20% of 2,4/2,6-toluene-diisocyanate
    from 5% to 14% of maleic anhydride
    from 45% to 60% of poly-(vinyl chloride)
    from 6% to 14% of phthalic anhydride
    from 1% to 5% of styrene
    from 0.1% to 0.5% of azobis-(isobutyronitrile)
    from 0.1% to 0.7% azodicarbonamide
    from 0.1% to 7% of butyl-tin mercaptide carboxylate or:
    from 0.1% to 7% of barium-zinc complex.

10. Cellular, foamed product characterized in that said product is formed from a mixture comprising:
    from 15% to 35% of 4,4,'diphenylmethane-diisocyanate
    from 48% to 55% of poly-(vinyl chloride)
    from 5% to 20% of phthalic anhydride
    from 0.1% to 1.5% of azodicarbonamide
    from 0.1% to 3% of magnesium oxide.

* * * * *